United States Patent
Cataldo et al.

(10) Patent No.: US 9,851,703 B2
(45) Date of Patent: Dec. 26, 2017

(54) METHOD FOR MANAGING THE DIALOGUE BETWEEN AN ITEM OF EQUIPMENT AND AT LEAST ONE MULTI-APPLICATION OBJECT

(75) Inventors: Christophe Cataldo, Puyricard (FR); Sophie Gabriele, Gardanne (FR); Christophe Mani, Cavaillon (FR); Fabrice Romain, Rians (FR)

(73) Assignee: STMicroelectronics (Rousset) SAS, Rousset (FR)

(*) Notice: Subject to any disclaimer, the term of this patent is extended or adjusted under 35 U.S.C. 154(b) by 841 days.

(21) Appl. No.: 13/993,609

(22) PCT Filed: Dec. 7, 2011

(86) PCT No.: PCT/EP2011/072002
§ 371 (c)(1),
(2), (4) Date: Jun. 12, 2013

(87) PCT Pub. No.: WO2012/080048
PCT Pub. Date: Jun. 21, 2012

(65) Prior Publication Data
US 2013/0268123 A1  Oct. 10, 2013

(30) Foreign Application Priority Data
Dec. 13, 2010 (FR) ...................................... 10 60424

(51) Int. Cl.
*G05B 15/02* (2006.01)
*G06K 7/00* (2006.01)
(Continued)

(52) U.S. Cl.
CPC ........... *G05B 15/02* (2013.01); *G06K 7/0008* (2013.01); *G06K 19/0723* (2013.01); *G06Q 20/3574* (2013.01)

(58) Field of Classification Search
CPC .............................. G05B 15/02; H04W 12/06
(Continued)

(56) References Cited

U.S. PATENT DOCUMENTS 5,530,232 A * 6/1996 Taylor .................... G06Q 20/02
235/375
5,721,781 A * 2/1998 Deo ...................... G06Q 20/341
705/67
(Continued)

FOREIGN PATENT DOCUMENTS

DE  102006057093  6/2008
EP  0944016  9/1999
(Continued)

OTHER PUBLICATIONS

W. Rankl, W. Effing, Smart Card Handbook, 3rd Ed, John Wiley & Sons, 2003.*
(Continued)

*Primary Examiner* — Christopher E Everett
(74) *Attorney, Agent, or Firm* — Slater Matsil, LLP

(57) ABSTRACT

A portable object includes an antenna and a processor coupled to the antenna. The processor is configured to communicate with an item of equipment according to a contactless communication protocol that contains an anti-collision procedure. The processor is also configured to execute a plurality of software modules. The software modules include application modules and a triggering module, which is configured to cause a triggering of the anticollision procedure between the single portable object and the item of equipment. The processor is configured to cause a signal, which is generated by executing the triggering module, to be transmitted from the antenna to the time of equipment.

28 Claims, 9 Drawing Sheets

(51) Int. Cl.
*G06K 19/07* (2006.01)
*G06Q 20/34* (2012.01)

(58) Field of Classification Search
USPC .......................................... 700/275; 340/586
See application file for complete search history.

(56) References Cited

U.S. PATENT DOCUMENTS

| | | | | |
|---|---|---|---|---|
| 7,232,073 | B1* | 6/2007 | de Jong | G06F 9/445 |
| | | | | 235/382 |
| 2002/0029343 | A1* | 3/2002 | Kurita | G06Q 20/341 |
| | | | | 713/185 |
| 2002/0040936 | A1* | 4/2002 | Wentker | G06F 8/60 |
| | | | | 235/492 |
| 2002/0066792 | A1* | 6/2002 | Guthery | G06F 12/08 |
| | | | | 235/492 |
| 2002/0100808 | A1* | 8/2002 | Norwood | G06K 19/077 |
| | | | | 235/486 |
| 2005/0092830 | A1* | 5/2005 | Blossom | G06K 19/06187 |
| | | | | 235/380 |
| 2005/0121513 | A1* | 6/2005 | Drummond | G06F 9/548 |
| | | | | 235/381 |
| 2005/0184164 | A1* | 8/2005 | de Jong | G06Q 20/341 |
| | | | | 235/492 |
| 2005/0184165 | A1* | 8/2005 | de Jong | G06Q 20/341 |
| | | | | 235/492 |
| 2005/0188360 | A1* | 8/2005 | de Jong | G06Q 20/341 |
| | | | | 717/136 |
| 2006/0022042 | A1 | 2/2006 | Smets et al. | |
| 2008/0011828 | A1* | 1/2008 | Mysore | G06Q 20/352 |
| | | | | 235/380 |
| 2008/0129450 | A1* | 6/2008 | Riegebauer | G06Q 20/341 |
| | | | | 340/5.86 |
| 2008/0212558 | A1* | 9/2008 | Aillaud | G06K 7/0008 |
| | | | | 370/345 |
| 2009/0050686 | A1* | 2/2009 | Kon | G06Q 20/327 |
| | | | | 235/375 |
| 2011/0042464 | A1* | 2/2011 | Itay | G06F 9/445 |
| | | | | 235/492 |
| 2011/0119497 | A1* | 5/2011 | Tsai | G06F 21/77 |
| | | | | 713/185 |

FOREIGN PATENT DOCUMENTS

| | | | | |
|---|---|---|---|---|
| EP | 1939822 | | 7/2008 | |
| WO | WO00/77717 | | 12/2000 | |
| WO | WO 2004057890 | A2* | 7/2004 | ........... G06K 7/0008 |
| WO | WO2010/011055 | | 1/2010 | |
| WO | WO2010/027765 | | 3/2010 | |

OTHER PUBLICATIONS

Klaus Finkenzeller, RFID Handbook, 2nd Ed, John Wiley & Sons, 2003.*
Gerhard Hancke, "A practical relay attack on ISO 14443 proximity cards", Jan. 2005.*
WO2004057890A2, published Jul. 8, 2004, KLaus, p. 1-8.*
Stephen A. Sherman, Richard Skibo, and Richard S. Murray, "Secure Network Access Using Multiple Applications of AT&T's Smart Card," AT&T Technical Journal, Sep./Oct. 1994, pp. 61-72.*
"Identification Cards—Contactless integrated circuit(s) cards—Proximity cards—Part 3: Initialization and anticollision," Bureau Casalonga Josse, www.afnor.org, ISO/CEI 14443-3:2001, Feb. 2001, 70 pages.
"Identification Cards—Contactless integrated circuits cards—Proximity cards—Part 2, Radio frequency power and signal interface," Bureau Casalonga Josse, www.afnor.org, ISO/CEI 1443-2:2010, Sep. 2010, 34 pages.

\* cited by examiner

METHOD FOR MANAGING THE DIALOGUE BETWEEN AN ITEM OF EQUIPMENT AND AT LEAST ONE MULTI-APPLICATION OBJECT

This application is a 371 national phase of PCT/EP2011/072002, filed on Dec. 7, 2011 which claims priority to French Application No. 1060424, filed on Dec. 13, 2010, contents of which are hereby incorporated herein by reference.

BACKGROUND

The invention relates to contactless communication between a multi-application portable object, for example a contactless smart card, and an item of equipment, for example a card reader.

Usually, a portable object capable of communicating according to a contactless communication protocol with a reader is associated with a single application, for example a bank application or else a transport application, etc. In order to be identified by the reader, the processing means of the portable object transmit a serial number which is similar to an identifier of this object.

Multi-application contactless cards also exist. In other words, the card contains various application modules respectively dedicated to different applications, for example a bank application, a transport application, etc.

Currently, the existing solutions for recognizing and identifying all the possible applications stored in a single card use complex command interchanges, mainly proprietary commands or else requiring a specific development of the software (OS: Operating System) incorporated into the processing means of the card. What is needed is an improved approach to multi-application objects.

BRIEF DESCRIPTION OF THE DRAWINGS

Advantages and features of the invention will appear on examination of the detailed description of embodiments which are in no way limiting and of the appended drawings in which.

DETAILED DESCRIPTION OF ILLUSTRATIVE EMBODIMENTS

Figure 1:
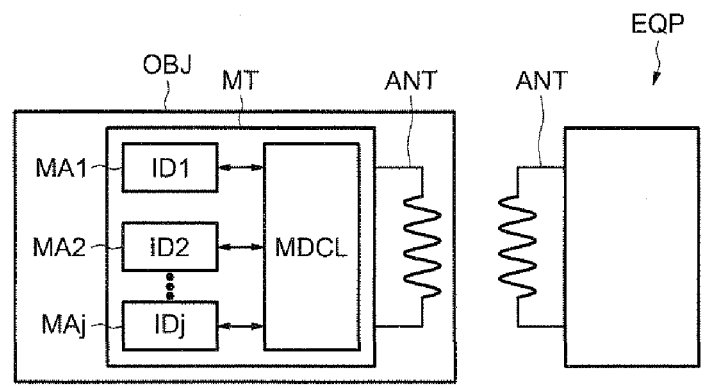
FIG. 1 illustrates schematically an embodiment of a portable object according to the invention.

Before addressing the illustrated embodiments in detail, various features and advantages of embodiments of the invention will be generally discussed in the following paragraphs.

According to one embodiment, the proposal is for a new method for managing the dialogue between an item of equipment and at least one multi-application object, the said method being capable of identifying and selecting the applications in the said object.

Also proposed, according to one embodiment, is to provide a response to many complex situations by using a standardized communication interchange and dispensing with proprietary command instructions.

According to one aspect, a method is proposed for managing the dialogue between an item of equipment and at least one object, these elements being capable of communicating according to a contactless communication protocol containing an anticollision procedure, the said object containing several application modules, the method comprising a detection of the said application modules by a triggering of the said anticollision procedure between the said at least one object and the said item of equipment.

Thus, provision is made in particular to simulate the presence of several single-application cards from the said multi-application card in order to force the item of equipment to trigger an anticollision procedure which will allow it to list the various applications, as if they were identifiers associated with different cards.

According to one embodiment, the application modules are respectively associated with several different identification items of information, and the detection of the application modules comprises a triggering of the said anticollision procedure on the said identification items of information.

An identification item of information may comprise, for example, as in the type B protocol of the ISO/IEC 14443 standard, an identifier contained in a field (called the PUPI field in the said standard) of a response to request signal (designated by ATQB in the said standard), or else as in the type A protocol of the ISO/IEC 14443 standard, an identifier (designated as UID in the said standard) and a response to request signal (designated by ATQA in the said standard) the said identifiers being dedicated, or else as in the ISO ISO 18000-6 standard, a pointer ("handle") drawn at random making it possible to designate the module uniquely.

Thus, the anticollision procedure can be triggered depending on the situation on the content of the identifier and therefore on the response signal dedicated to the module (type B protocol), on the content of the response to request signal and on the content of the identifier (type A protocol) or on the value of the pointer.

According to one embodiment, the said detection of the application modules comprises, in response to at least one command signal sent by the item of equipment, a transmission by the said objet of at least one response signal containing an item of information representative of a collision, and a triggering of the anticollision procedure in response to the said response signal.

Such a management method can be applied to any contactless communication protocol containing an anticollision procedure. In this respect, it is possible to cite as a non-limiting example, the ISO 15693 standard, ISO 18000-2 to 18000-7, the ISO 18092 standard or else the anticollision procedure described in European Patent No. 0 944 016. This being so, this management method can be applied more particularly to at least one object capable of communicating with the said item of equipment according to the type A protocol or the type B protocol defined in the ISO/IEC 14443 standard.

According to one embodiment, applicable to the type A protocol of the ISO/IEC 14443 standard, the transmission of a bit having a first logical value, for example the logical value 1, comprises a modulation of a carrier with a sub-carrier for a first half of a predetermined period (also called "bit time") based on a first command sequence, while the transmission of a bit having a second logical value, for example the logical value 0, comprises a modulation of the carrier with the sub-carrier for the second half of the said predetermined period based on a second command sequence; and, the transmission of the said item of information representative of a collision comprises a modulation of the said carrier with the sub-carrier for the whole of the predetermined duration based on a third command sequence.

According to one embodiment, the generation of the said at least one response signal comprises on the basis of several elementary response signals respectively associated with the application module, at least two bits of the same rank in the various elementary response signals having different logical values, a comparison of the bits of the same rank in the various elementary response signals, and, in the event of matching between all the bits of the same rank, a generation, for the rank in question, of the first command sequence or of the second command sequence depending on the logical value of the bit in question, and, in the event of mismatching between at least two bits of the same rank, a generation for the rank in question of the said third command sequence, and, a modulation of the carrier with the sub-carrier based on the said generated command sequences.

According to one embodiment, the said at least one command signal belongs to the group formed by a request command signal designated by REQA in the ISO/IEC 14443 standard, a wake-up command signal designated by WUPA in the ISO/IEC 14443 standard, an anticollision command signal designated by ANTICOLLISION in the ISO/IEC 14443 standard and the elementary response signals corresponding to these command signals belong to the group formed by a response to request signal designated by ATQA in the ISO/IEC 14443 standard and a response signal containing at least one portion of the identifier of an application module designated by UID CLn in the ISO/IEC 14443 standard.

According to an embodiment that is applicable when the object is capable of communicating with the said item of equipment according to the type B protocol defined in the ISO/IEC 14443 standard, the transmission of the data bytes is carried out in the form of characters themselves transmitted in the form of frames, and the transmission of the said collision item of information comprises a generation of an invalid frame and the transmission of the said invalid frame.

As a non-limiting example, an invalid frame may be a frame comprising an incorrect error detection code for the cyclic redundancy check ("CRC" according to an acronym well known to those skilled in the art).

According to one embodiment, the respective identification items of information of the application modules comprise identifiers respectively associated with different numbers of time slots, and during the anticollision procedure each identifier is transmitted in the time slot for which the slot number is associated with the said identifier.

According to one embodiment, the said at least one command signal belongs to the group formed by a request command signal designated by REQB in the ISO/IEC 14443 standard, a wake-up command signal designated by WUPB in the ISO/IEC 14443 standard, a slot marker command designated by "slot marker" in the ISO/IEC 14443 standard, and the elementary response signals corresponding to these command signals comprise a response to request signal designated by ATQB in the ISO/IEC 14443 standard.

According to another aspect, the proposal is for an object comprising processing means configured for communicating with an item of equipment according to a contactless communication protocol containing an anticollision procedure; according to a general feature of this aspect, the processing means comprise several different application modules and triggering means configured to cause a triggering of the said anticollision procedure between the said object and the said item of equipment.

In order to cause the said triggering of the anticollision procedure, the triggering means are for example configured to transmit a signal containing an item of information representative of a collision.

According to one embodiment, the application modules are respectively associated with several different identification items of information, and the triggering means are configured to cause a triggering of the said anticollision procedure on the said identification items of information.

According to one embodiment, the triggering means are configured in order, in response to at least one command signal sent by the item of equipment, to transmit at least one response signal containing an item of information representative of a collision.

According to a variant, the processing means are configured to communicate with the said item of equipment according to the type A protocol defined in the ISO/IEC 14443 standard.

According to an embodiment applicable to this variant, the processing means comprise modulation means configured for modulating a sub-carrier based on a command sequence, first activation means configured for generating a first command sequence and activating the modulation means in order to modulate the carrier for a first half of a predetermined period so as to transmit a bit having a first logical value, second activation means configured for generating a second command sequence and activating the modulation means in order to modulate the carrier for a second half of the said predetermined period so as to transmit a bit having a second logical value, and the triggering means comprise third activation means configured for generating a third command sequence and activating the modulation means in order to modulate the carrier for the whole of the said predetermined period so as to transmit the said item of information representative of a collision.

According to an embodiment also applicable to the said variant, the triggering means comprise determination means configured to determine the said at least one response signal based on several elementary response signals respectively associated with the application modules, at least two bits of the same rank in the various elementary response signals having different logical values, the determination means comprising comparison means configured for making a comparison of the bits of the same rank in the various elementary response signals, and the determination means are configured, in the event of matching between all the bits of the same rank, for generating for the rank in question the first command sequence or the second command sequence, and, in the event of mismatching between at least two bits of the same rank, generating for the rank in question the said third command sequence, and the modulation means are configured for modulating the carrier with the sub-carrier based on the said generated command sequences.

According to another variant, the processing means are configured to communicate with the said item of equipment according to the type B protocol defined in the ISO/IEC 14443 standard.

According to one embodiment applicable to this other variant, the processing means comprise transmission means configured for transmitting data bytes in the form of characters themselves transmitted in the form of frames, and the triggering means comprise generation means configured for generating an invalid frame and delivering it to the transmission means.

According to an embodiment also applicable to this other variant, the respective identification items of information of the application modules comprise identifiers respectively associated with different numbers of time slots, and during the anticollision procedure the processing means are configured for transmitting each identifier in the time slot for which the slot number is associated with the said identifier. Irrespective of the variant, the means configured for generating a response signal designed to cause the triggering of an anticollision procedure can be achieved in whole or in part by software means and/or logic circuits.

In FIG. 1, the reference OBJ designates a portable object, for example a contactless smart card, or any device incorporating a contactless wireless function, or else a device containing such a smart card such as for example a mobile telephone, or else containing such a device. The object OBJ comprises processing means MT, for example a microprocessor, connected to an antenna ANT capable of being in inductive coupling with the antenna ANT of an item of equipment EQP, for example a reader, for the transmission of the items of information between the object and the item of equipment. In the example described here, the object OBJ is a multi-application object. In other words, the processing means in this instance comprise several application modules MA1, MA2 . . . MAj, respectively associated with different identification items of information ID1, ID2, . . . IDj.

These application modules can be software modules dedicated to particular and different applications, for example a bank application, a transport application, an access control application, etc.

The object OBJ is capable of communicating with the item of equipment EQP according to a contactless communication protocol containing an anticollision procedure. And, as will be seen in greater detail below, the detection of the various application modules is carried out by a triggering of the anticollision procedure between the object and the item of equipment, advantageously on the identification items of information IDj. Therefore it is provided that the processing means MT comprise triggering means MDCL configured to cause a triggering of the said anticollision procedure between the object OBJ and the item of equipment EQP.

Figure 2:
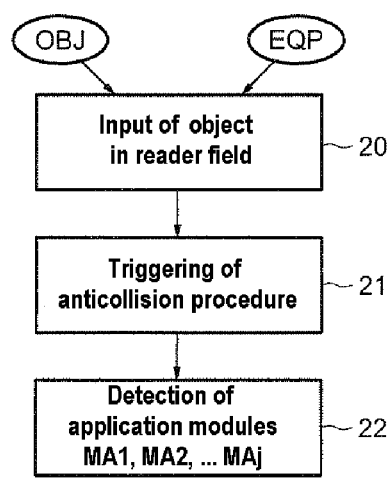
FIGS. 2 and 3 illustrate schematically an embodiment of a method according to the invention.
Figure 3:
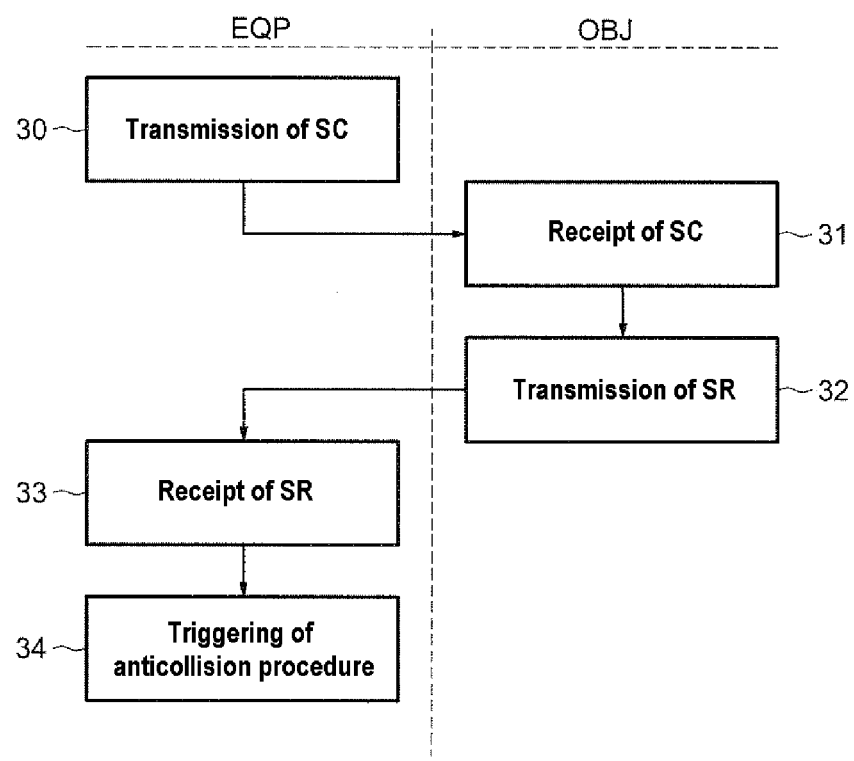

In general, as illustrated in FIG. 2, when the object OBJ enters (step 20) the field of the reader EQP, the latter will trigger the anticollision procedure (step 21) so as to be able to detect the various application modules MA1, MA2, MAj, and more precisely, in certain cases, the identifiers of these modules contained in the identification items of information ID1, ID2, IDj (step 22). More precisely, the detection of the application modules comprises for example, as illustrated in FIG. 3, a transmission by the item of equipment EQP (step 30) of a command signal SC, which can be, for example, an REQA or REQB signal in the case of an application complying with the ISO/IEC 14443 standard. The object OBJ then receives (step 31) this command signal SC and generates and transmits (step 32) a response signal SR containing an item of information representative of a collision.

As will be seen in greater detail below, this item of information representative of a collision can be different depending for example on the protocol used in the ISO/IEC 14443 standard.

On receipt 33 of this signal SR, the item of equipment EQP triggers (step 34) the anticollision procedure.

Although the invention applies to any wireless communication protocol having an anticollision procedure, there now follows a more detailed description, with reference more particularly to FIGS. 4 to 14, of a management of the dialogue between the item of equipment EQP and the object OBJ in the case of a dialogue according to a contactless communication protocol defined in the ISO/IEC 14443 standard.

Those skilled in the art will be able, with reference to this, to refer to the said standard, and more particularly to parts 2 and 3 of this standard, respectively contained in the documents ISO/CEI 14443-3:2001 and ISO/CEI 14443-2: 2010. These two documents are for all intents and purposes incorporated in the content of the present patent application by reference.

In general, the dialogue between the item of equipment EQP and the object OBJ according to the ISO/IEC 14443 standard is carried out in the following manner activation of the object OBJ by the radiofrequency electromagnetic field produced by the item of equipment EQP, the object OBJ silently awaits the receipt of a command from the item of equipment EQP, transmission of a command by the item of equipment EQP, transmission of a response by the object OBJ.

The item of equipment produces an AC radiofrequency electromagnetic field which makes it possible to power the object OBJ and which is modulated for the interchange of items of information between the object and the item of equipment. The frequency of the radiofrequency field is equal to 13.56 MHz.

The item of equipment EQP modulates the amplitude of the AC electromagnetic field with modulation pulses so as to transmit the data to the object OBJ.

The object OBJ, for its part, loads the AC electromagnetic field with a modulated sub-carrier (load modulation) so as to transmit the data to the item of equipment EQP.

We will return in greater detail below to the transmission of the bits as a function of their logical value.

An embodiment applicable to the type A protocol of the ISO/IEC 14443 standard will now be described in greater detail with more particular reference to FIGS. 4 to 8.

In order to detect the objects that are in the electromagnetic field of operation of the reader, the latter repetitively sends request command signals designated by REQA in the ISO/IEC 14443 standard. In response to such a request command signal, provision is made for the object to return a response to request signal designated by ATQA in the ISO/IEC 14443 standard.

Note here that, in the type A protocol of the ISO 14443 standard, the object can assume various states. More precisely, in a switched-off state, the object is not powered because of the lack of carrier energy.

In the IDLE state, the object is powered up. It listens to the commands and must recognize the REQA and WUPA signals. WUPA is a wake-up command signal. The object can switch to its READY state when it has received an REQA or WUPA command and transmitted a response signal ATQA. In the READY state, it is possible to apply the bit-frame anticollision procedure defined in the ISO 14443 standard. When a card is selected with its complete identifier, the card then switches to an ACTIVE state in which it listens to any higher-layer message.

The card can then switch to a STOP state when it receives a specific command. In this STOP state, the card responds only to a WUPA command.

Figure 4:
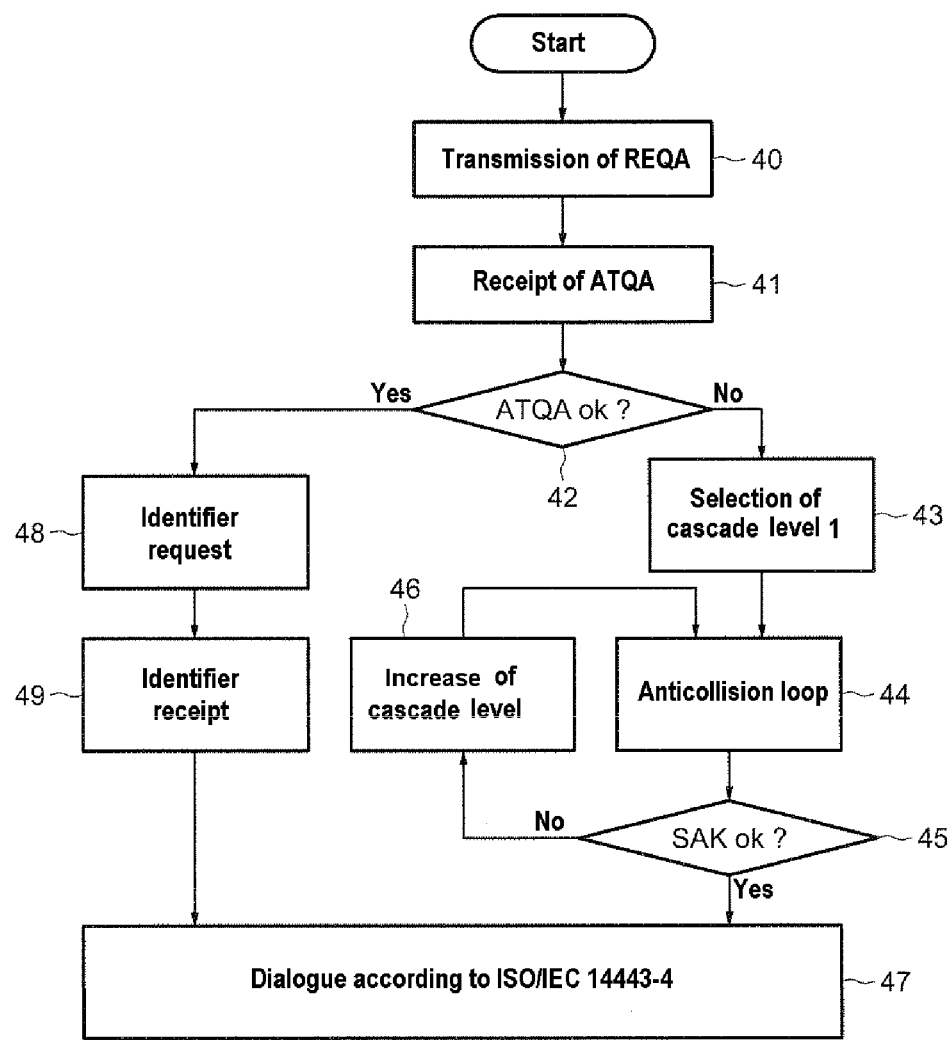
FIGS. 4 to 8 illustrate in greater detail but still schematically an embodiment of the method according to the invention that is applicable to a type A protocol defined in the ISO/IEC 14443 standard.

Reference will now be made more particularly to FIG. 4 to describe the detection and the identification of the various identifiers of the application modules of the object OBJ.

When the type A protocol is used, a response signal ATQA and an identifier designated as UID are dedicated to each application module. In other words, the identification item of information IDj of a module MAj comprises the response signal ATQAj and the identifier UIDj that are dedicated to this module.

Assume first of all that the object OBJ is in its idle state and that the item of equipment EQP sends, for example, the request command signal REQA (step 40).

As will be seen in greater detail below, the triggering means of the object OBJ will transmit a response signal ATQA (step 41) containing a collision item of information designed to cause the triggering of the anticollision procedure.

We will return in greater detail below to the generation of such a signal ATQA.

In step 42, the content of the signal ATQA is verified. Since the latter contains a collision item of information, the item of equipment EQP interprets this as a collision originating from the presence of several cards in the field of the item of equipment. Consequently, the item of equipment EQP triggers an anticollision procedure allowing it to detect and identify an identifier associated with an application module (which the reader will consider to be an actual object) so as to select this application module. This anticollision procedure comprises the selection of the cascade level no. 1 (according to this protocol, each identifier designated as UID may consist of one, two or three portions corresponding to one, two or three cascade levels, each portion being referenced UID CLn, where n designates the cascade level).

Then, the anticollision loop is applied (step 44). After this anticollision loop, a check is made to ascertain whether the identifier selected by the loop is or is not complete, with the aid of a signal SAK (step 45). This signal SAK comprises a cascade bit. If the cascade bit is at "1" for example, it means that the identifier obtained is not complete. In this case, the anticollision loop is reapplied increasing the cascade level (step 46). If the cascade bit of the signal SAK is equal to "0", it then means that the selected identifier is indeed complete. In this case, the application module is considered to be in its ACTIVE state (step 47) and is ready to receive higher-level commands.

Steps 40 to 47 are then repeated so as to identify and select the other identifiers of the other application modules that have still not switched to their ACTIVE state.

When the penultimate identifier of the penultimate application module has been identified, the last application module in response to the signal REQA sends a signal ATQA which, on this occasion, does not include any collision information. In this case, after step 42, the item of equipment EQP sends an identifier request (step 48) in response to which the application module returns its complete identifier. After receipt of this complete identifier (step 49) all the application modules are in their ACTIVE state (step 47).

If it is assumed now, as an example, that the reader EQP is a bank application reader, and that the object OBJ comprises two application modules the first of which MA1 associated with the identification item of information ID1 is a module dedicated to a transport application, while the application module MA2 is a module dedicated to a bank application, the reader will for example first select the module MA1 associated with the identification item of information ID1 while sending to the object OBJ a signal containing the identifier UID1 associated with a specific command of the bank type. Since the module MA1 is a module dedicated to a transport application, it will not recognize the specific command sent and will transmit an error message. In this case, the reader will select the second application module and send to it a signal containing its identifier UID2 associated with the said specific bank command. This time, the command will be recognized by the application module MA2 and the dialogue will be able to begin.

This being so, it is also possible, if the identifier UIDj of one application module comprises an indication relative to the said application, that the reader directly recognizes the type of application of the module based on its identifier and selects it directly by sending it the appropriate command.

Figure 5:
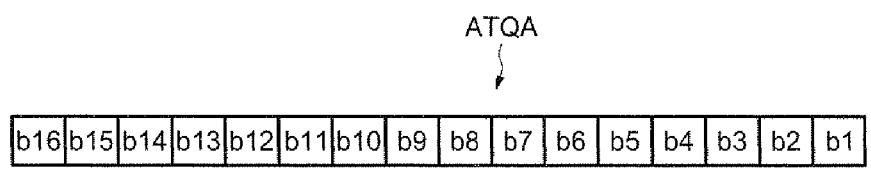
Figure 6:
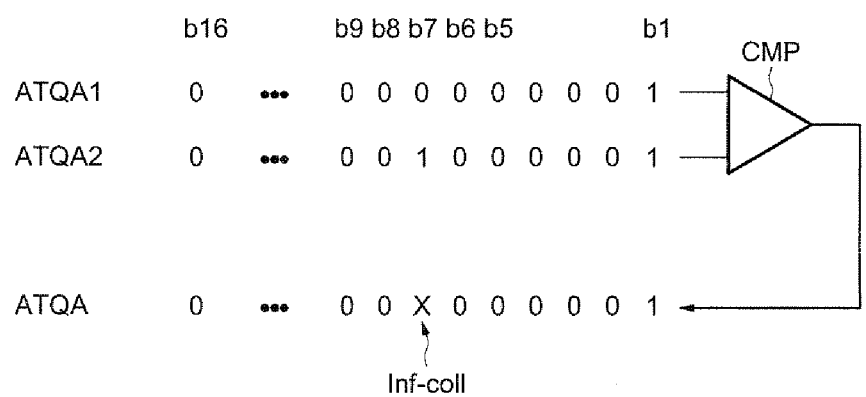

Reference is now made more particularly to FIGS. 5 and 6 in order to illustrate the generation of a response signal, for example of the ATQA type, containing a collision item of information which will cause the triggering by the reader EQP of the anticollision procedure.

A signal ATQA is a signal comprising sixteen bits b1-b16. Bits b1 to b5 are bits designating an anticollision of the bit frame type, as defined in the ISO 14443 standard. One of the five bits b1-b5 must be set at "1" in order to indicate the anticollision of the bit frame.

Bits b6 and b13 to b16 are bits set at zero which are reserved for later use of the standard. Bits b9 to b12 are private encoding bits while bits b7 and b8 indicate the size of the identifier UID. Thus, if the two bits b7 and b8 have the logical value "0", it means that the identifier UID is of single size with a single cascade level. If bit b7 is equal to "1" and bit b8 is equal to "0", the size of the identifier UID is then double with two cascade levels whilst, if bit b7 is equal to "0" and bit b8 is equal to "1", the size of the identifier UID is then triple with three cascade levels.

Assume now, with reference more particularly to FIG. 6, that the object OBJ comprises two application modules, the identifier UID of the application module MA1 having a single size while the identifier UID of the application module MA2 has a double size.

The triggering means of the object then comprise determination means designed to generate the response signal ATQA based on the response signals ATQA1 and ATQA2 dedicated to the two application modules MA1 and MA2. Since the identifier UID of the module MA1 has a single size, bits b7 and b8 of the signal ATQA1 are equal to "0". On the other hand, since the identifier UID of the module MA2 has a double size, the bits b7 and b8 of the signal ATQA2 are respectively equal to "1" and "0".

Suppose also, in this example, that bit b1 of each signal ATQA1 and ATQA2 is equal to "1". In general, for there to be formation of a collision item of information, at least two bits of the same rank in the various elementary response signals, in this instance the signals ATQA1 and ATQA2, should have different logical values. That is the case here for bit b7.

Naturally, if the two identifiers UID of the two application modules had the same size, which would lead to bits b7 and b8 of the same logical value in both signals ATQA1 and ATQA2, these two signals should be differentiated by at least one of bits b1 to b5 for example.

Provision is then made for the determination means to comprise comparison means CMP which will compare the signals ATQA1 and ATQA2 bit by bit, so as to generate the response signal ATQA that will be transmitted to the item of equipment EQP.

After this comparison, if all the bits of the same rank in the elementary signals ATQ1, ATQ2, have the same logical value, the bit with the corresponding rank in the signal ATQA will also have the same logical value. On the other hand, if at least two bits of the same rank have different logical values, which is the case in the example described here for bits b7, the bit of corresponding rank in the signal ATQA will be replaced by a collision item of information Inf-coll.

Figure 7:
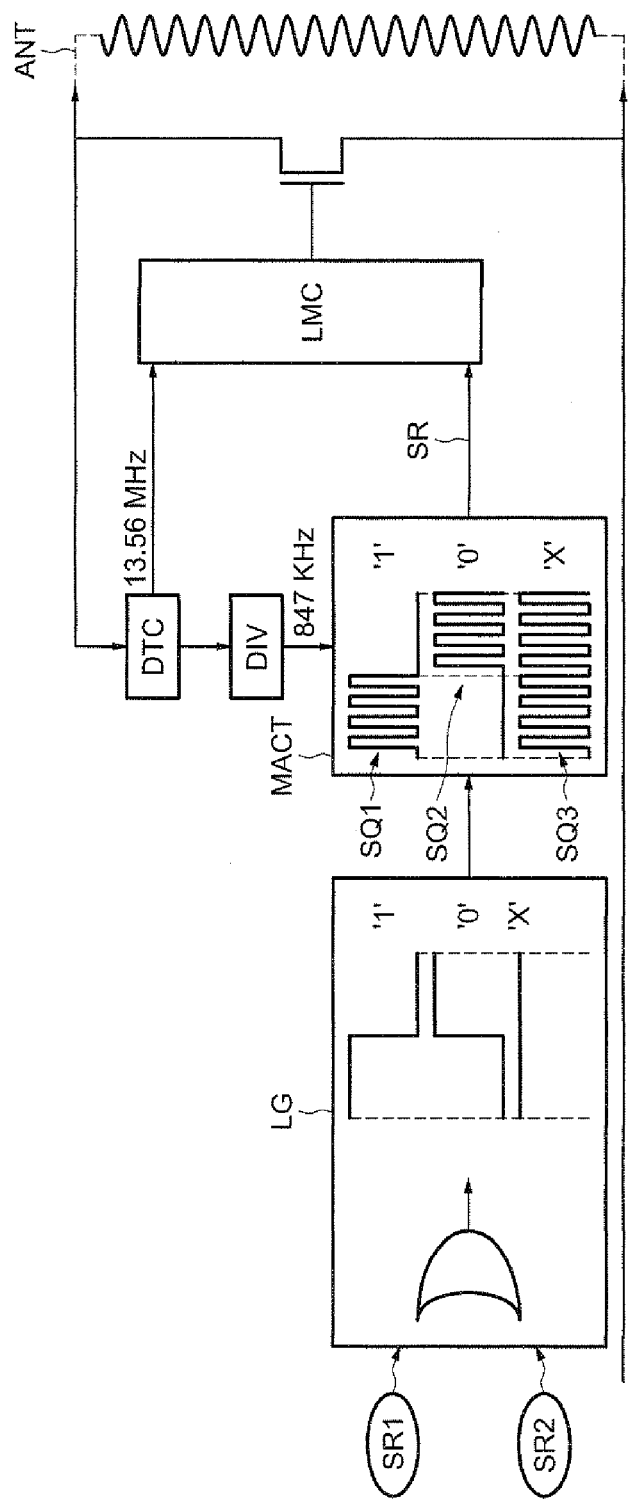

In order to give more details concerning this collision item of information in the case of the type A protocol of the ISO 14443 standard, reference is now made more particularly to FIG. 7.

The transmission of a bit having a first logical value, for example the logical value "1", comprises a modulation of the carrier with a sub-carrier of frequency 847 kHz, for a first half of a predetermined period called "bit time", based on a first command sequence SQ1. The transmission of a bit having a second logical value, for example the value "0", comprises a modulation of the carrier with the sub-carrier for the second half of the predetermined period, based on a second command sequence SQ2 and a transmission of the item of information Inf-coll representative of a collision comprises a modulation of the carrier with the sub-carrier for the whole of the predetermined period based on a third command sequence SQ3.

In practice, a logic LG (fulfilling the function of the comparison means CMP of FIG. 6) comprising logical gates, for example of the "OR" type, receives successively the bits of the same rank of the elementary response signals SR1 and SR2 (for example the signals ATQA1 and ATQA2) and delivers at an output a succession of commands to activation means MACT. These activation means MACT moreover receive a timing signal at 847 kHz (the frequency of the sub-carrier) delivered by an eight divider DIV receiving as an input the carrier timing signal at the frequency 13.56 MHz, this timing signal having been retrieved from the antenna ANT by a detector DTC also of conventional structure.

Based on the timing signal at 847 kHz and on the output of the logic LG, the means MACT generate a succession of sequences comprising sequences SQ1, SQ2 and at least one sequence SQ3 so as to form the response signal that will be transmitted to the item of equipment EQP so as to cause the triggering of the anticollision procedure. The signal SR is transmitted to modulation control means LMC, of conventional structure, which command the gate of a transistor connected to the antenna ANT. The modulation control means LMC also receive the carrier timing signal at the frequency 13.56 MHz.

Figure 8:
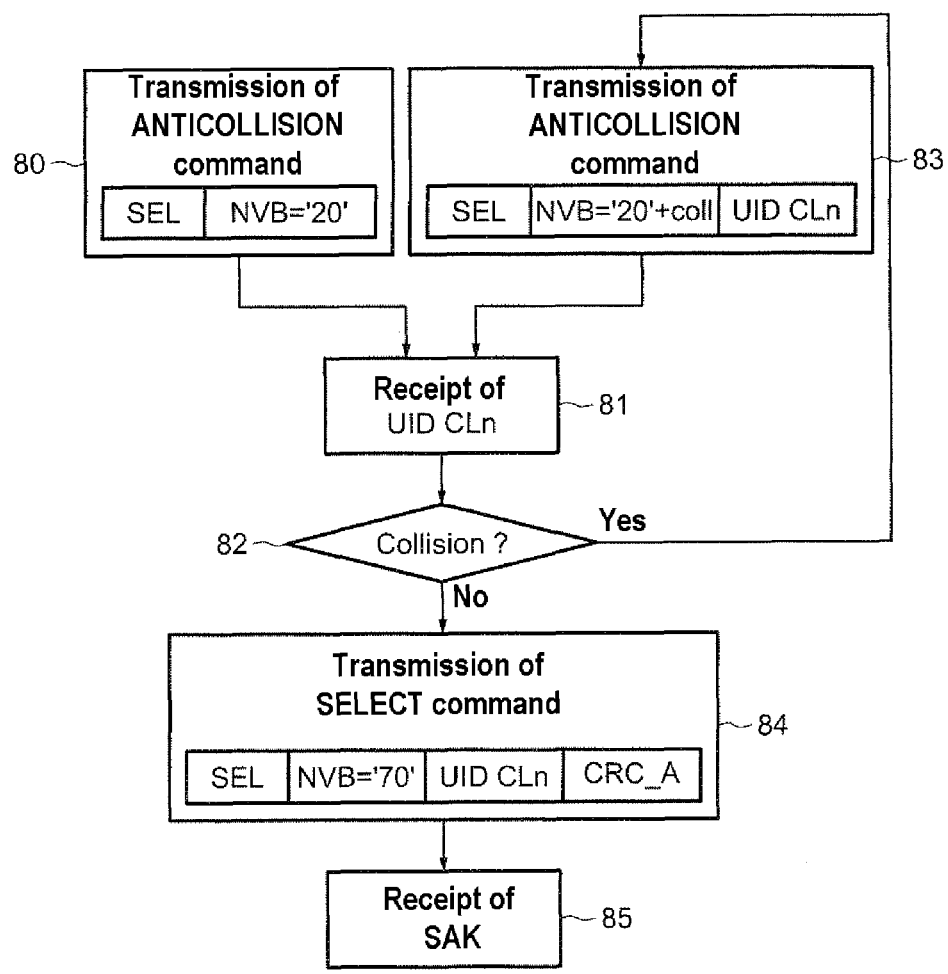

Reference is now made more particularly to FIG. 8 in order to illustrate in greater detail the application of the anticollision loop.

In a step 80, the item of equipment EQP transmits an anticollision command signal designated ANTICOLLISION in the ISO/IEC 14443 standard. This anticollision command comprises a field SEL designating notably the cascade level and a field NVB which in this instance is assigned the value "20". In the ISO/IEC 14443 standard, this value forces all proximity cards to respond with their identifying portion UID CLn corresponding to the cascade level designated by the field SEL.

In the present embodiment of the invention, on receipt of such an anticollision command, an identifier UID CLn, generated based on the various identifiers UID Cln of the various application modules, will be generated and then transmitted by the object and received by the item of equipment (step 81).

In this respect, since the identifiers of the various application modules are different, the resulting identifier UID Cln that is transmitted from the object to the item of equipment EQP is generated in a manner similar to that which has been described with reference to FIG. 6 for the response signal ATQA. Since, by definition, the identifiers of the various application modules are different, there will necessarily exist, in the identifier UID Cln transmitted to the item of equipment, at least one collision item of information Inf-coll.

Consequently, in step 82, a collision is detected by the item of equipment EQP. The item of equipment EQP recognizes the position "coll" of the first collision. The item of equipment EQP then transmits in step 83 a new anticollision command in which the field NVB has a value which specifies the number of valid bits of the identifier UID Cln that has been received. The valid bits are the bits that have been received before receipt of the collision item of information Inf-coll. These valid bits are then followed by a bit having a predetermined logical value decided upon by the item of equipment, for example the value "1".

The anticollision command transmitted in step 83 then comprises the field SEL, the field NVB, followed by the valid bits of the identifier UID CLn. Only the application modules of the object of which a portion of UID CLn is equal to the valid bits transmitted by the item of equipment EQP must transmit their remaining bits of the identifier UID CLn.

Also, if several application modules are involved, there is again a new resulting UID CLn that is generated within the triggering means of the object, in the same way as has been described with reference to FIG. 6.

This will cause a new collision which will be detected in step 82 and will again produce the transmission of an anticollision command taking account of the new collision position. When no more collisions are detected in step 82, the item of equipment EQP transmits a selection command called "SELECT" in which the field NVB takes the value "70" which means that the item of equipment EQP transmits within this command "SELECT" the whole of the selected portion of identifier UID CLn.

This command "SELECT" moreover comprises in conventional manner a correction code field CRC_A. The application module of which the identifier portion corresponds to the identifier portion contained in the command "SELECT", responds with the signal SAK.

We now return to step 45 of FIG. 4.

Reference is now made more particularly to FIGS. 9 to 14 to describe an embodiment of the invention that is applicable in the case of a dialogue according to the type B protocol defined in the ISO/IEC 14443 standard.

Just as for type A, the data transmission from the object to the item of equipment takes place by modulation with the aid of a sub-carrier. For further details, those skilled in the art should refer to the document ISO/IEC 14443-2:2010 mentioned above.

Figure 9:
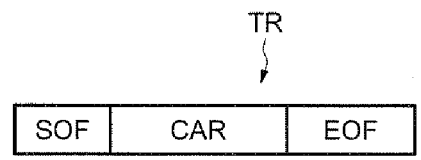
FIGS. 9 to 15 illustrate in greater detail but still schematically an embodiment of the invention that is applicable to the type B protocol defined in the ISO/IEC 14443 standard.

In the type B protocol, the transmission of the data bytes is carried out in the form of characters CAR, themselves transmitted in the form of frames TR (FIG. 9). The frame TR is normally delimited by a start of frame SOF and by an end of frame EOF.

Figure 10:

The format of a character comprises a start bit having the logical value "0" followed by a data byte and a stop bit having the logical value "1". Moreover, the frames also comprise a field CRC_B containing an error detection code for the cyclic redundancy check (FIG. 10). The field CRC_B is computed in conventional manner based on the data bits DT excluding the start bits, the stop bits, the byte delays, the starts of frame and ends of frame and the bits of the field CRC_B itself.

Figure 11:
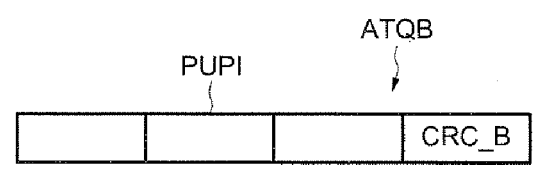

Just like the type A protocol, provision is made in the type B protocol in response to a request command signal REQB, or a wake-up command signal WUPB, for the transmission via the object of a response signal ATQB as illustrated schematically in FIG. 11. More precisely, the signal ATQB comprises notably a field comprising in the ISO 14443 standard the identifier of the object, called PUPI. In this aspect of the present invention, this field of a signal ATQB will contain the identifier PUPI of an application module of the object.

The field ATQB also comprises a field CRC_B. In this instance the identifier PUPI of an application module forms the identification item of information ID of the module.

According to one embodiment of the method according to the invention, the transmission of the said collision item of information then comprises a generation of an invalid frame and the transmission of the said invalid frame.

An invalid frame may be for example a frame comprising an errored CRC_B. This being so, this is only an example. Other possibilities are provided such as for example the generation of a frame comprising no start of frame field or else comprising no end of frame field, or else in which at least some of the start bits and/or stop bits are missing.

Figure 12:
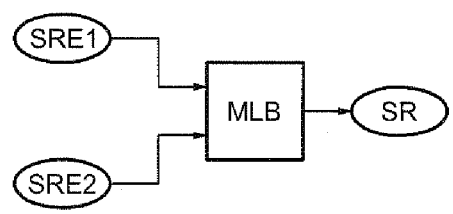

As illustrated in FIG. 12, the generation means MLB, which may be for example software means, will generate the response signal containing the said collision item of information (invalid frame) based on elementary response signals SRE1 and SRE2.

The anticollision procedure described in the ISO/IEC 14443 standard provides in particular a dialogue between the reader and the various proximity cards within time slots.

Provision is then made for the respective identifiers of the application modules to be respectively associated with different time slot numbers and, during the anticollision procedure, each identifier is transmitted in the time slot for which the slot number is associated with the said identifier.

Figure 13:
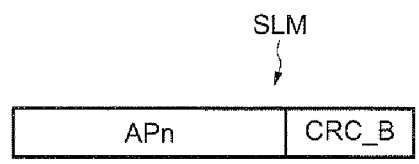

In this respect, it is possible to use the slot marker command referenced SLM in FIG. 13. More precisely, the command SLM comprises a field CRC_B and a field APn comprising the time slot number.

Figure 14:
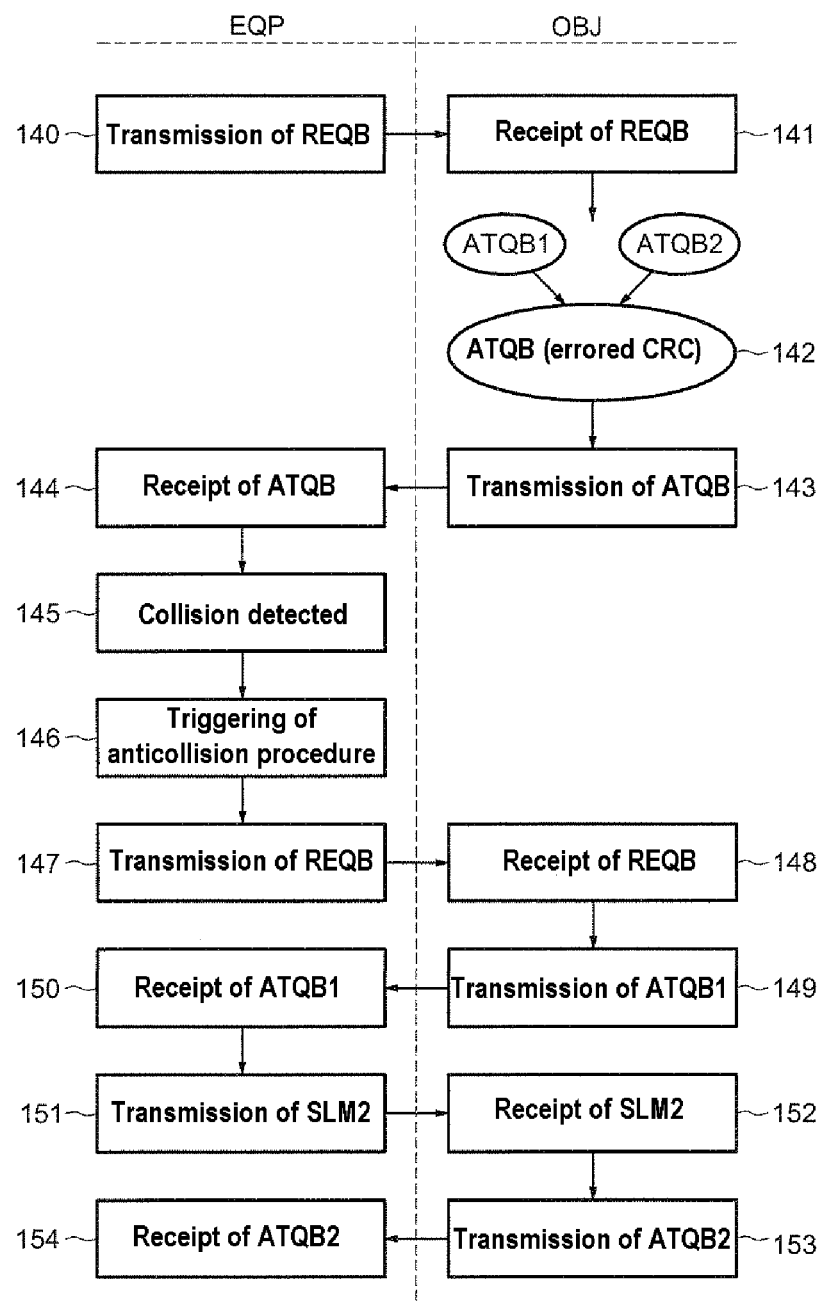

Reference is now made more precisely to FIG. 14 to illustrate an example of anticollision procedure allowing the identification of the various identifiers of the application modules of the object.

In step 140, the item of equipment transmits a request command signal REQB. It is assumed in this instance that the object OBJ comprises two application modules. On receipt of the signal REQB by the object (step 141), a response signal ATQB comprising an errored CRC is generated in step 142 based on the response signals ATQB1 and ATQB2 respectively associated with two application modules.

The signal ATQB is then transmitted (step 143) to the item of equipment EQP which receives it in step 144. Since the received frame is invalid, a collision is detected (step 145) which triggers the anticollision procedure (step 146) provided in the type B protocol of the ISO/IEC 14443 standard.

The item of equipment EQP then again transmits a signal REQB this time comprising, in the "parameter" field, a value corresponding to a number of slots equal for example to six.

It is assumed in this instance that the identifier ID1 (PUPI) of the application module MA1 is associated with the first time slot, while the identifier ID2 (PUPI) of the second application module of the object is associated with the time slot no. 2.

On receipt of the command REQB (step 148) corresponding to slot no. 1, all that is transmitted is the signal ATQB1 relating to the module MA1 and containing the identifier ID1 of this module in the signal ATQB1. After receipt of this signal ATQB1 (step 150), the signal SLM2 designating slot no. 2 is transmitted (step 151).

On receipt of this slot marker SLM2 (step 152), the object transmits the signal ATQB2 (step 153) containing, in the corresponding field, the identifier ID2 of the second application module.

This signal is received in step 154 by the item of equipment EQP. The item of equipment then transmits successively the slot markers of slots 3 to 6. But, since no response is received, the item of equipment EQP deduces therefrom the presence of two identifiers associated to two different application modules.

At this stage, the various application modules are in their ACTIVE state and, in a manner similar to what was described with reference to the type A protocol, the reader can then send specific commands associated with its application.

Figure 15:
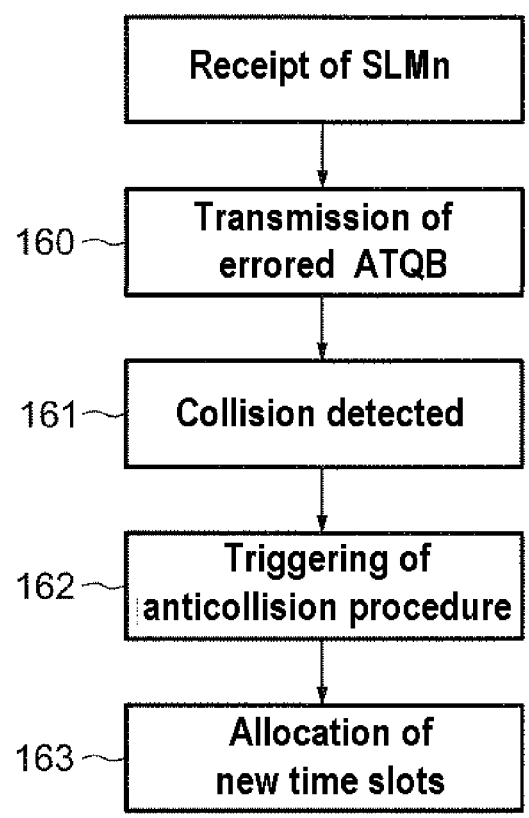

When the number of time slots is below the number of application modules, an anticollision procedure will be triggered in response to the slot marker command (SLM) designating the last slot. More precisely, in response to this last slot marker command SLMn (FIG. 15), the object transmits an errored ATQB (invalid frame) (step 160). A collision will therefore be detected (step 161) in the item of equipment, which will trigger a new anticollision procedure (step 162) with the allocation of new time slots (step 163).

The invention claimed is:

1. A method for managing a communication dialogue between an item of equipment and a single portable object according to a contactless communication protocol containing an anticollision procedure, the single portable object communicating with the item of equipment using a single antenna that is coupled to a processor, which is configured to execute a plurality of application modules, the method comprising:
   detecting the plurality of application modules of the single portable object by the item of equipment by triggering of the anticollision procedure between the single portable object and the item of equipment, wherein detecting the plurality of application modules comprises, in response to a command signal sent by the item of equipment,
   sending a command signal from the item of equipment to the single portable object;
   receiving by the item of equipment, from the single antenna of the single portable object, a response signal containing an identification item of information; and
   triggering the anticollision procedure in response to the response signal, wherein the identification item of information is generated by the single portable object by comparing responses generated by the plurality of application modules in response to the command signal, and wherein the identification item of information comprises at least one item representative of a collision, the one item representative of a collision being generated by the comparing the response generated by the plurality of application modules.

2. The method according to claim 1, wherein the plurality of application modules are respectively associated with a plurality of different identification items of information, and the detection of the plurality of application modules comprises a triggering of the anticollision procedure on the plurality of different identification items of information.

3. The method according to claim 1, wherein the single portable object and the item of equipment communicate according to the type A protocol defined in the ISO/IEC 14443 standard.

4. The method according to claim 1, wherein transmission of a bit having a first logical value comprises a modulation of a carrier with a sub-carrier for a first half of a predetermined period based on a first command sequence and transmission of a bit having a second logical value comprises a modulation of the carrier with the sub-carrier for a second half of the predetermined period based on a second command sequence, and receiving the response signal containing the identification item of information representative of a collision comprises receiving a modulation of the carrier with the sub-carrier for all of the predetermined period based on a third command sequence.

5. The method according to claim 4, further comprising generating the response signal based on a plurality of elementary response signals respectively associated with the plurality of application modules, at least two bits of the same rank in the plurality of elementary response signals having different logical values, the generating comprising
comparing the bits of the same rank in the plurality of elementary response signals;
when all the bits of the same rank match, generating, for the rank in question, the first command sequence or of the second command sequence;
when at least two bits of the same rank do not match, generating, for the rank in question, the third command sequence; and
modulating the carrier with the sub-carrier based on the generated command sequences.

6. The method according to claim 5, wherein the command signal comprises a request command signal designated by REQA in the ISO/IEC 14443 standard, a wake-up command signal designated by WUPA in the ISO/IEC 14443 standard, or an anticollision command signal designated by ANTICOLLISION in the ISO/IEC 14443 standard, and wherein the elementary response signals comprise a response to request signal designated by ATQA in the ISO/IEC 14443 standard or a response signal containing at least one portion of an identifier of an application module designated by UID CLn in the ISO/IEC 14443 standard.

7. The method according to claim 5, wherein the respective identification items of information of the plurality of application modules comprise identifiers respectively associated with different numbers of time slots, and during the anticollision procedure each identifier is transmitted in the time slot for which the slot number is associated with the identifier.

8. The method according to claim 7, wherein the command signal a request command signal designated by REQB in the ISO/IEC 14443 standard, a wake-up command signal designated by WUPB in the ISO/IEC 14443 standard, or a slot marker command designated by "slot marker" in the ISO/IEC 14443 standard, and wherein the elementary response signals comprise a response to request signal designated by ATQB in the ISO/IEC 14443 standard.

9. The method according to claim 1, wherein the single portable object communicates with the item of equipment according to the type B protocol defined in the ISO/IEC 14443 standard.

10. The method according to claim 1, wherein the communication dialogue between the item of equipment and the single portable object comprises transmission of data bytes, the data bytes comprising characters transmitted in frames, and wherein transmitting the response signal containing the identification item of information representative of a collision comprises generating an invalid frame and transmitting the invalid frame.

11. A single portable object comprising:
an antenna;
a processor coupled to the antenna and configured to communicate with an item of equipment according to a contactless communication protocol that contains an anticollision procedure, wherein the processor is also configured to execute a plurality of software modules, the software modules comprising:
a plurality of application modules; and
a triggering module configured to cause a triggering of the anticollision procedure between the single portable object and the item of equipment, the triggering including having a signal transmitted from the antenna to the item of equipment, the signal being generated by comparing responses generated by the plurality of application modules by the triggering module, the signal comprising at least one item representative of a collision, the one item representative of a collision being generated by the comparing the responses generated by the plurality of application modules.

12. The single portable object according to claim 11, wherein the plurality of application modules are respectively associated with a plurality of different identification items of information, and the triggering module is configured to cause a triggering of the anticollision procedure on the plurality of different identification items of information.

13. The single portable object according to claim 12, wherein the triggering module is configured to initiate transmission of a response signal containing an item of information representative of a collision in response to a command signal sent by the item of equipment.

14. The single portable object according to claim 13, wherein the processor comprises:
a modulator configured to modulate a carrier with a sub-carrier based on a command sequence,
a first activation module configured to generate a first command sequence and to activate the modulator in order to modulate the carrier for a first half of a predetermined period so as to transmit a bit having a first logical value;
a second activation module configured to generate a second command sequence and to activate the modulator in order to modulate the carrier for a second half of the predetermined period so as to transmit a bit having a second logical value; and
wherein the triggering module comprises a third activation module configured to generate a third command sequence and to activate the modulator in order to modulate the carrier for all of the predetermined period so as to transmit the item of information representative of a collision.

15. The single portable object according to claim 14, wherein the triggering module comprises a determination module configured to determine the response signal based on several elementary response signals respectively associated with the plurality of application modules, at least two bits of the same rank in the several elementary response signals having different logical values, the determination module comprising a comparison module configured to make a comparison of the bits of the same rank in the several elementary response signals;

wherein the determination module is configured, in the event of matching between all the bits of the same rank, to generate for the rank in question the first command sequence or the second command sequence, and, in the event of mismatching between at least two bits of the same rank, to generate for the rank in question the third command sequence; and wherein the modulator is configured to modulate the carrier with the sub-carrier based on the generated command sequences.

16. The single portable object according to claim 15, wherein the command signal is a request command signal designated by REQA in the ISO/IEC 14443 standard, a wake-up command signal designated by WUPA in the ISO/IEC 14443 standard, or an anticollision command signal designated by ANTICOLLISION in the ISO/IEC 14443 standard; and wherein the elementary response signals comprise a response to request signal designated by ATQA in the ISO/IEC 14443 standard or a response signal containing at least one portion of an identifier of an application module designated by UID CLn in the ISO/IEC 14443 standard.

17. The single portable object according to claim 13, wherein the processor is configured to communicate with the item of equipment according to the type B protocol defined in the ISO/IEC 14443 standard.

18. The single portable object according to claim 17, wherein the plurality of different identification items of information of the plurality of application modules comprise identifiers respectively associated with different numbers of time slots, and during the anticollision procedure, the processor is configured to transmit each identifier in the time slot for which the slot number is associated with the identifier.

19. The single portable object according to claim 18, wherein the command signal comprises a request command signal designated by REQB in the ISO/IEC 14443 standard, a wake-up command signal designated by WUPB in the ISO/IEC 14443 standard, or a slot marker command designated by "slot marker" in the ISO/IEC 14443 standard, and wherein elementary response signals comprise a response to request signal designated by ATQB in the ISO/IEC 14443 standard.

20. The single portable object according to claim 13, wherein the processor comprises a transmission module configured to transmit data bytes comprising characters transmitted in frames, and wherein the triggering module comprises a generation module configured to generate an invalid frame and to deliver the invalid frame to the transmission module.

21. The single portable object according to claim 11, wherein the processor is configured to communicate with the item of equipment according to the type A protocol defined in the ISO/IEC 14443 standard.

22. The single portable object according to claim 11, wherein the single portable object comprises a contactless smart card.

23. The single portable object according to claim 22, wherein the single portable object comprises a device containing a contactless smart card.

24. The single portable object according to claim 23, wherein the device comprises a mobile telephone.

25. A single portable object comprising:
an antenna;
a processor coupled to the antenna, the processor configured to:
execute a plurality of applications modules;
generate a response to a REQA request according to ISO/IEC 14443 standard protocol by comparing responses from ATQA responses generated by the plurality of application modules according to ISO/IEC 14443 standard protocol, or
generate a response to a REQB request according to ISO/IEC 14443 standard protocol by comparing responses from ATQB responses generated by the plurality of application modules according to ISO/IEC 14443 standard protocol; and
transmit the response via the antenna, wherein the response comprises at least one item representative of a collision, the item representative of a collision being generated by the comparing the responses from ATQA responses generated by the plurality of application modules or by the comparing the responses from ATQB responses generated by the plurality of application modules.

26. The single portable object of claim 25, wherein the processor is configured to generate a response to a REQA request according to ISO/IEC 14443 standard protocol by comparing responses from ATQA responses generated by the plurality of application modules according to ISO/IEC 14443 standard protocol.

27. The single portable object of claim 25, wherein the processor is configured to generate a response to a REQB request according to ISO/IEC 14443 standard protocol by comparing responses from ATQB responses generated by the plurality of application modules according to ISO/IEC 14443 standard protocol.

28. The single portable object according to claim 25, wherein the single portable object comprises a mobile telephone.

* * * * *